United States Patent Office 3,391,987
Patented July 9, 1968

3,391,987
COMPOSITION AND METHOD FOR
RETARDING EVAPORATION
Lloyd E. Myers, Tempe, Ariz., assignor to the United
States of America as represented by the Secretary of
Agriculture
No Drawing. Filed Nov. 13, 1964, Ser. No. 411,160
9 Claims. (Cl. 21—60.5)

ABSTRACT OF THE DISCLOSURE

An admixture of a 12–24 carbon atom alcohol and a water-soluble saccharide is contacted with a body of water to retard normal evaporation of water from said body.

---

A non-exclusive irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel compositions and methods for retarding evaporation from bodies of water exposed to the atmosphere, e.g., water contained in ponds, reservoirs, irrigation tanks and canals, etc. Further objects of the invention will be evident from the following description wherein parts and percentages are by weight unless otherwise specified.

The first attempts to reduce evaporation from reservoirs by creating surface films involved scattering flakes or powders of film-forming materials, particularly long-chain alkanols, on the water surface, but the method was generally ineffective because wind blew the material across the water surface and stranded it on the shore. Floating boxes of wire mesh were then used to contain the alkanol flakes or pellets but were also unsatisfactory because the flakes or pellets and the wire mesh often became coated with dust, algae and bacterial crusts which interfered with release of material from the rafts. Attempts to develop powder dispensers were not successful because of mechanical problems and the caking of the powders. Application of alkanols dissolved in solvents has been tried but has not been satisfactory because of the high cost of solvents, solidification of concentrated alkanol solutions at low temperatures, and the fact that public health agencies consider most acceptable solvents to be pollutants and will not permit their application to potable water supplies. Systems for melting the alkanol and applying it as a spray have been developed but the heating systems are hazardous and mechanical problems have been encountered, such as clogging of nozzles by solidification of the alkanol during intermittent operation. A scheme has been patented (Patent No. 2,903,330) for applying suspensions or emulsions of powdered alkanol in water to water surfaces by spraying or dripping but some of the suspensions or emulsion described in the patent have not been completely stable and have required an elaborate and expensive application system incorporating constant agitation as well as pumps, extensive pipes or tubing and spray nozzles. Attempts have been made to apply alkanol emulsions with drip barrels, sometimes incorporating wind activated valves to control release of the emulsion, but emulsion instability or thickening, clogging of discharge orifices, control of the application rate, and general maintenance of the systems have been problems. A recent development is packaging of powdered alkanol in water-soluble envelopes which can be thrown by hand onto water surfaces so that the alkanol is released as the envelope dissolves. This method has the disadvantage of requiring periodic application by hand and therefore does not provide a continuous supply of alkanol. A scheme has also recently been devised for using a power driven rotary brush to abrade particles from a solid cake of alkanol and a blower to distribute the particles over the water surface. Application is made from a boat traveling about in the reservoir. This scheme requires the presence of two men to operate the equipment and does not provide continuous application of the retardant. A system for applying molten or powdered alkanol from aircraft is under development but this method does not provide continuous application of the retardant.

In accordance with the invention, a composition is prepared comprising an evaporation retardant, typically a long-chain alkanol such as hexadecanol, and a water-soluble carrier, typically a sugar or a vegetable gum. In use, blocks of the composition are placed in the body of water to be protected from evaporation and as the carrier is dissolved, particles of the retardant are continually released to form an evaporation-retarding film on the water surface. An important feature of the invention is that the rate of release of retardant can be readily controlled to suit individual circumstances. Such control can be achieved, for example, by varying the formulation of the composition, by varying the size and/or shape of the blocks into which the composition is formed, by varying the disposal of the blocks with regard to surface of water or the area of the blocks exposed to the water, etc. Because of the facility of control of the rate of retardant release, the invention offers the significant advantage that it can be tailored to local conditions—such as air and water currents, water and air temperature, etc.—to provide optimum retardation of evaporation with minimum loss of retardant.

Additional advantages of the invention are as follows: It does not require the use of any solvents, emulsifiers, or other materials which may be classified as pollution, and can be freely applied to potable water supplies. It does not require the use of a power source or any mechanical devices, valves, orifices, tubing, or nozzles which can malfunction. It will provide continuous application of evaporation retardant for long periods of time without any need for maintenance or other attention.

No novelty is claimed in the evaporation retardants, per se. In preparing the compositions of the invention one can use any of the known retardants. Typically these will be any of the aliphatic alcohols containing 12 to 24 carbon atoms. The alcohols may be saturated and alcohols of this type, especially hexadecanol, octadecanol, and mixtures thereof, are preferred. Unsaturated alcohols such as oleyl alcohol may be used but are not among the preferred embodiments.

The carrier in accordance with the invention is a water-soluble saccharide. Typical examples of compounds in this category are monosaccharides such as glucose and fructose; disaccharides such as sucrose, maltose, and lactose; polysaccharides such as dextrins, soluble starches, agar, gum tragacanth, gum arabic, acacia gum, karaya and other vegetable gums, carragheen, algin, pectin, dextran, methyl cellulose, hydroxyethyl cellulose, sodium carboxymethyl cellulose, sodium carboxymethyl starch, etc. It is not essential to use individual compounds; mixtures of saccharides may be employed. Indeed, among the preferred carriers are the carbohydrate syrups. These usually contain one or more sugars in admixture with high molecular weight saccharides such as dextrins. Typically one may use molasses, corn syrups, malt syrups, maple syrups, sorghum syrups, and syrups obtained by the saccharification of wood or cellulosic agricultural residues such as straw. These syrups may be used as such, or they may be concentrated or blended with solid materials such as sucrose, glucose, a vegetable gum, or the like. It is evident that by choice of the saccharide carrier one can regulate the rate of release of retardant from the composition. For example where the carrier contains dextrins, gums, or other materials of higher molecular weight, the retardant will be released at a slower rate than where the carrier is a simple sugar such as sucrose or glucose. Also as hereinafter explained, the carrier may be blended with more or less water to provide regulation of the rate of retardant release. Typically where the carrier contains more water, the composition will release the retardant more readily, and vice versa.

Preparation of the compositions of the invention involves basically an intimate mixing of the evaporation retardant with the carrier. The retardant can be applied to the mixing step in solid form in which case it is first subdivided into small particles or powder. In the alternative, the retardant can be applied to the mixing step in liquid form, obtained by melting it. Where the carrier is a solid such as sucrose, glucose, gum tragacanth, etc., it is preferred to blend the carrier with water before mixing it with the retardant. The amount of water may be varied, for example, to product a thick liquid, paste, or gel. Generally where the carrier is a sprup, such as corn syrup, it is used as such in preparing the composition or it may be first subjected to evaporation to reduce its moisture content thus to eventually form a composition of thicker consistency and which releases the retardant at a slower rate. Since the retardant and carrier are of diverse properties, the first being hydrophobic the second hydrophilic, it is evident that the compositions will not be in the nature of true solutions but can be described as dispersions of particles of the retardant in a matrix of the carrier. For best results it is preferred that the composition contain a matrix of saccharide material throughout which the retardant is dispersed in the form of minute particles. One plan to ensure that the retardant is in minute particles is to apply it to the mixing step in the form of a fine powder. Another plan is to apply heat so that at least the retardant, preferably both retardant and saccharide, are in a liquid condition during the mixing. Also, high speed or high shear mixing is preferred as producing smaller particles than low shear mixing. It is within the scope of the invention that the composition include other ingredients besides the retardant and carrier, as for example, coloring materials, fillers such as bentonite or fine-divided silica, surface agents to enhance film spreading, germacides to protect the retardant and/or carrier against bacterial degradation, antioxidants to protect the retardant from oxidative degradation. As noted hereinafter it may be desired to regulate the density of the composition, to cause it to float or sink as desired for a particular application. Where lower density, i.e., buoyancy, is desired, air or other gas may be whipped into the composition as it is being formed. Where greater density is desired a dense material such as powdered calcium or barium sulphate, ground rock, said, etc. may be incorporated in the composition. Depending on the choice of materials for formulating it, particularly the amount of water present, the composition of the invention may range from a semisolid or pasty condition to a solid condition. The relative proportions of evaporation retardant and carrier are not critical and may be varied according to circumstances. Typically, the composition may contain 5 to 75% of the retardant and 95 to 25% of matrix material (saccharide, water, and other ingredients).

For application to tanks, reservoirs and other bodies of water the retardant-saccharide composition is formed into blocks by conventional procedures such as molding, e.g., filling the warm composition into a mold and cooling it there so that it assumes the shape of the mold. The blocks may take any desired shape such as cubes, slabs, cylinders, etc. The blocks may be floated on the water surface, suspended just below the water surface, or placed at the bottom of the tank or reservoir. Floating on the water surface can be accomplished by formulating the composition to produce a material less dense than water, e.g., by incorporating air or other gas in the composition as described hereinabove. In the alternative, the blocks can be attached to an auxiliary float. In any event where floating blocks are used, it is preferred that they be anchored against wind movement. For suspension under the water surface, blocks compounded to be denser than water or open containers filled with the composition can be suspended from an anchored float whereby retardant particles are released under water and float to the surface to form a film. This method of suspension under the water surface is preferred as it protects the material against the excessive breakdown which may be caused by agitation of the water surface on a floating block. The third method involves dropping a block or open container of the composition into the water so that it sinks and rests on the bottom. Released particles of retardant float to the water surface to form a film. For submerged application it is preferred that the retardant particles be of sufficient size—40 to 70 microns diameter or larger, for example, 150 to 200 microns— to provide adequate buoyancy of individual particles to insure floating on the water surface.

As noted above, the rate of release of retardant can be regulated by formulation of the composition. The rate of release can also be controlled by variance in the size and shape of the blocks exposed to the water under treatment. Other things being equal by exposing a greater surface of the composition to the water the rate of release of retardant is increased, and vice versa.

In a special modification of the invention, the composition is arranged so that the exposed area remains relatively constant as it is eroded away by action of the water. This has the advantage that the retardant is released at substantially a uniform rate. Such results can be attained in various ways. One plan is to form the composition into a block of special shape which exhibits a substantially uniform surface area as the block is exposed to water and eroded thereby. A typical shape which provides this result is a cylinder having a star-shaped longitudinal perforation extending through the central axis, similar to the shape of powder grains, solid-fuel rocket charges, and the like which yield constant burning rates. Another plan is to coat a block of the composition with a waterproof material such as paraffin, leaving a portion of the block uncoated to provide a "window" which remains substantially constant in area as the block is eroded. A third plan is to fill the composition into a container provided with an opening of selected area. On exposure of the container and contents to the water, this opening will act as the determinant of the rate of release of retardant and maintain this rate substantially constant. This embodiment of the invention may be applied for example by providing a cylinder of metal, plastic, or other water-proof sheet material having an open end, packing the composition into the container, and then exposing the filled container to contact with the body of water to be protected from evaporation.

The invention is further demonstrated by the following illustrative examples.

EXAMPLE 1

21.5 grams of powdered alkanol (containing about 29% hexadecanol, 63% octadecanol, and 8% other alkanols) with average particle dimensions approximately 150 to 200 microns, was stirred by hand into 39.0 grams of household corn syrup, specific gravity 1.39, at about 75° F., to make a paste. Upon placing in water at 80° F. a 0.1-gram lump of the paste floated and disintegrated very slowly, releasing alkanol particles at a rate which produced about 50 square centimeters of surface film per minute.

EXAMPLE 2

35.8 grams of powdered alkanol, as in Example 1, was mixed by hand into 40.2 grams corn syrup, specific gravity 1.32, at 75° F., to make a paste. Upon placing in water at 80° F. a 0.1-gram lump of the paste floated and disintegrated rapidly, releasing alkanol particles at a rate which produced about 1700 square centimeters of surface film per minute.

EXAMPLE 3

33.0 grams of powdered alkanol, as in Example 1, was mixed by hand at 75° F. into a gel of 1.5 grams of gum tragacanth in 50 grams of tap water to make a paste. Upon placing in water at 80° F. a 0.1-gram lump of the paste floated and disintegrated slowly, releasing alkanol particles at a rate which produced about 250 square centimeters of surface film per minute.

EXAMPLE 4

Tw hundred grams of white, granulated, can sugar were dissolved in 100 grams of water at 200° F.; 100 grams of alkanol, as in Example 1, were melted at 140° F. and 10 grams of a commercial alkyl quaternary ammonium chloride emulsifier were added to the alkanol; the melted alkanol was then stirred into the hot sugar solution by hand with a spatula. Upon cooling, the mixture formed a smooth waxy solid which sank upon placing in water and dissolved slowly. A prewetted 0.1-gram lump of the solid held at the 80° F. water surface released very fine particles of alkanol, about 15 to 25 microns average diameter, to produce about 3800 square centimeters of surface film per minute. Evaporation from a 274-centimeter diameter, 91-centimeter deep tank was reduced by 50% by floating a small block of the sugar-alkanol mixture at the water surface with a piece of foamed plastic.

EXAMPLE 5

Two hundred grams of granulated white cane sugar were dissolved in 50 grams of water at 200° F.; 100 grams of alkanol, as in Example 1, were melted at 140° F. and stirred into the hot sugar solution by hand with a spatula. Upon cooling, the mixture formed a waxy solid with a slightly crystalline texture. A 0.1-gram lump of the solid sank upon placing in 80° F. water and dissolved slowly, releasing alkanol particles of about 40 to 70 microns average diameter which floated to the water surface to produce about 440 square centimeters of surface film per minute. A glass test tube, 2.2-centimeter inside diameter and 17 centimeters long, was filled with the sugar-alkanol mixture and placed in a 274-centimeter diameter, 91-centimeter deep tank. The tube was suspended from a small float with the open end of the tube about 0.5 centimeter below the water surface. Over a 2-week period, alkanol particles were released at a reasonably constant rate of about 0.5 gram alkanol per day and evaporation was reduced about 40%. This reduction was accomplished in spite of the presence of a heavy film of dust and algae on the water surface.

EXAMPLE 6

Thirty grams of powdered alkanol, as in Example 1, were mixed by hand at room temperature into a gel of 3 grams of hydroxyethyl cellulose and 67 grams of water. A 0.1-gram lump of the product placed in water at 80° F. released alkanol particles at a rate which produced 3030 square centimeters of surface film per minute.

Having thus described the invention, what is claimed is:

1. A composition for retarding normal evaporation in bodies of water exposed to the atmosphere, comprising an intimate admixture of (a) an aliphatic alcohol having 12 to 24 carbon atoms and (b) a water-soluble saccharide.
2. The composition of claim 1 wherein the saccharide is a sugar.
3. The composition of claim 1 wherein the saccharide is a carbohydrate syrup.
4. The composition of claim 1 wherein the saccharide is a gum.
5. A method for retarding normal evaporation of a body of water exposed to the atmosphere which comprises maintaining in contact with the water a composition containing (a) an aliphatic alcohol having 12 to 24 carbon atoms and (b) a water-soluble saccharide in intimate admixture.
6. The method of claim 5 wherein the saccharide is a sugar.
7. The method of claim 5 wherein the saccharide is a carbohydrate syrup.
8. The method of claim 5 wherein the saccharide is a gum.
9. A method for retarding normal evaporation of a body of water open to the atmosphere which comprises exposing to the water a constant area of a composition containing (a) an aliphatic alcohol having 12 to 24 carbon atoms and (b) a water-soluble saccharide in intimate admixture.

References Cited

UNITED STATES PATENTS

| | | | |
|---|---|---|---|
| 3,036,880 | 5/1962 | Malkemus | 21—60.5 |
| 3,085,850 | 4/1963 | Egan | 21—60.5 |
| 3,095,263 | 6/1963 | Eckert | 21—60.5 |
| 3,112,167 | 11/1963 | Millikan et al. | 21—60.5 |
| 3,146,059 | 8/1964 | Suzuki et al. | 21—60.5 |

MORRIS O. WOLK, *Primary Examiner.*

S. MARANTZ, *Assistant Examiner.*